United States Patent [19]

Miller

[11] Patent Number: 4,622,902
[45] Date of Patent: Nov. 18, 1986

[54] HATCH COVER AND LOCKING STRUCTURE

[76] Inventor: Roy W. Miller, 2545 Lincoln St., Highland, Ind. 46322

[21] Appl. No.: 635,710

[22] Filed: Jul. 30, 1984

[51] Int. Cl.⁴ ............................................. B61D 39/00
[52] U.S. Cl. ................................. 105/377; 220/314; 220/324; 292/241; 292/256.5; 292/259 R; 292/DIG. 60
[58] Field of Search ............... 105/377; 292/240, 241, 292/200, 196, DIG. 60, 257, 258, 259 R, 256.5; 220/314, 324

[56] References Cited

U.S. PATENT DOCUMENTS

| | | | |
|---|---|---|---|
| 2,408,733 | 10/1946 | Campbell | 105/377 |
| 2,627,950 | 2/1953 | Dath | 292/241 |
| 2,679,419 | 5/1954 | Borland | 105/377 X |
| 3,583,334 | 6/1971 | Schuller | 105/377 |
| 4,388,873 | 6/1983 | Carleton et al. | 105/377 |
| 4,441,431 | 4/1984 | Carney, Jr. et al. | 105/377 |
| 4,570,816 | 2/1986 | Ferris et al. | 270/314 |

Primary Examiner—Robert B. Reeves
Assistant Examiner—Glenn B. Foster
Attorney, Agent, or Firm—Richard J. Myers & Assoc.

[57] ABSTRACT

The hatch of a cargo vessel, such as the hopper of a covered hopper car, is sealed by a hatch cover having a locking arrangement which prevents the hatch cover from being blown open by pressure within the hopper upon unlocking the lock. An over center locking arm has two locking detents on it which coact with two locking detents on a locking bar to selectively provide a sealed, pressure blow off and hatch open position. A rotative adjustment is provided to enable the sealing pressure of the hatch cover on the hatch to be selectively adjustable.

19 Claims, 7 Drawing Figures

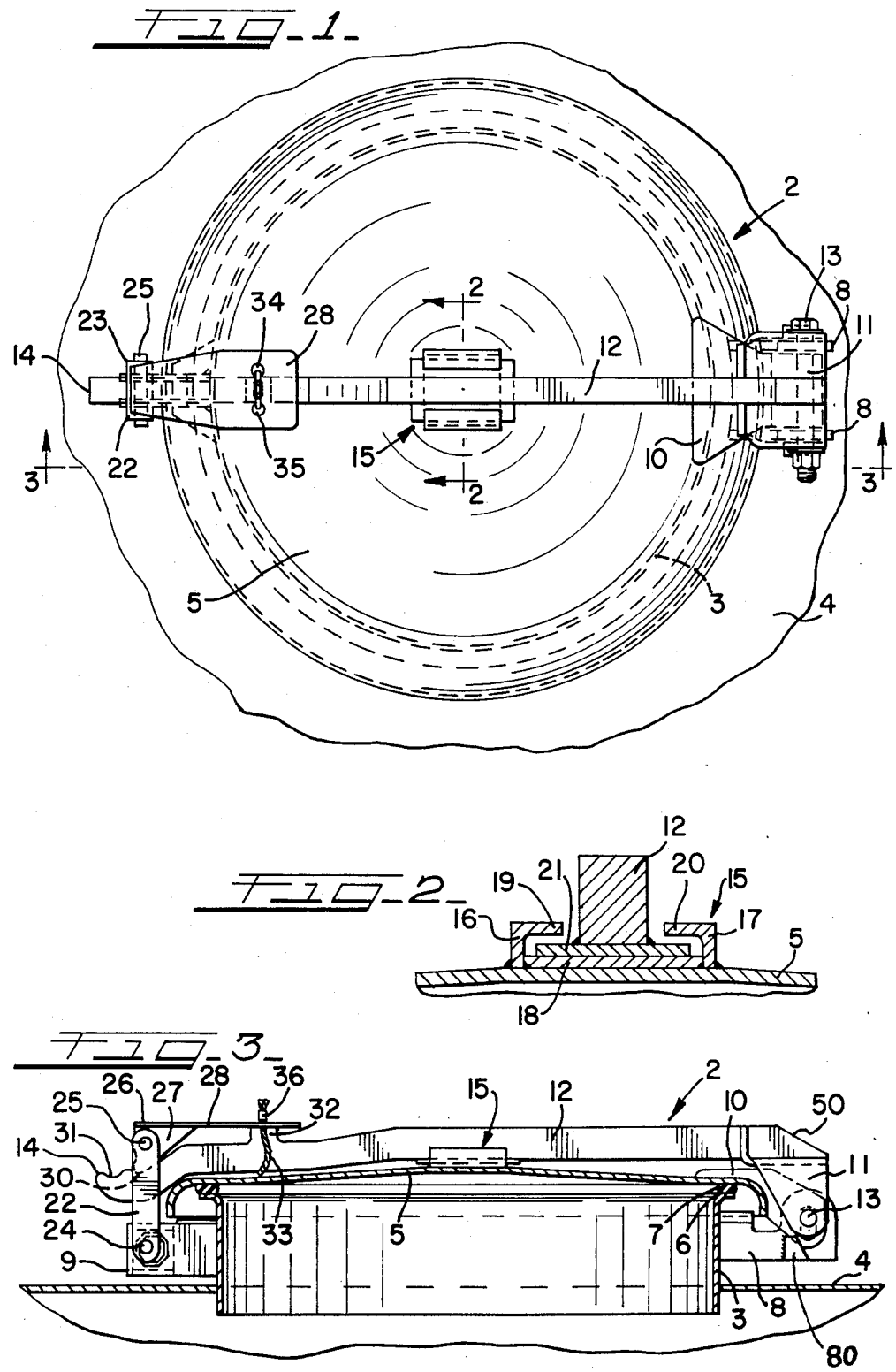

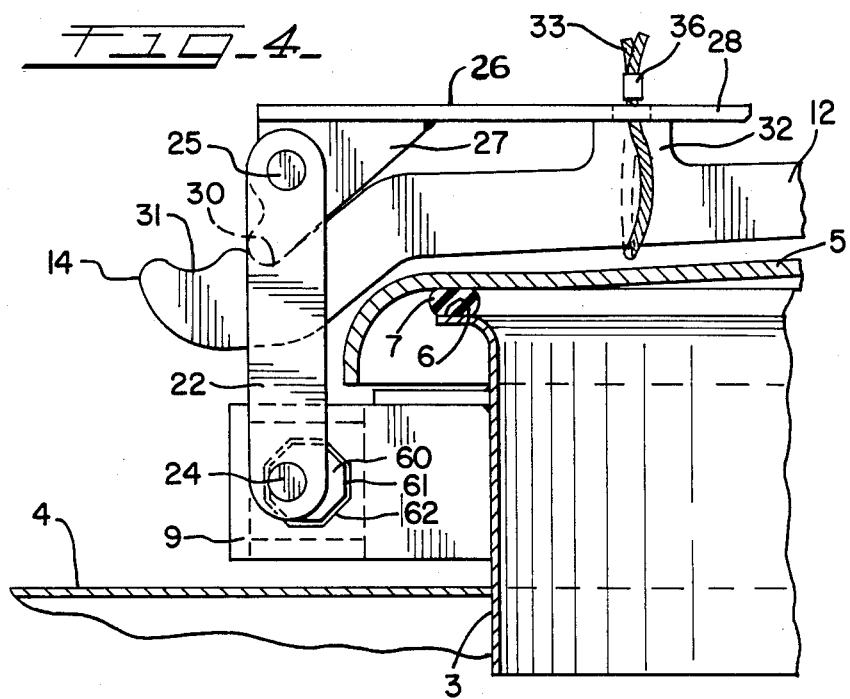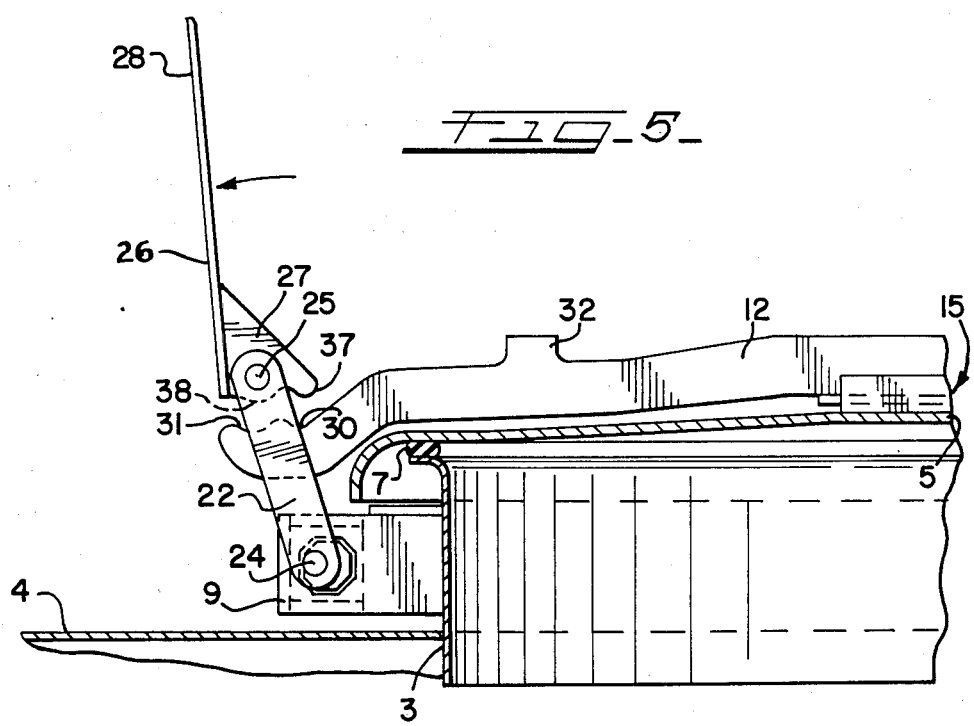

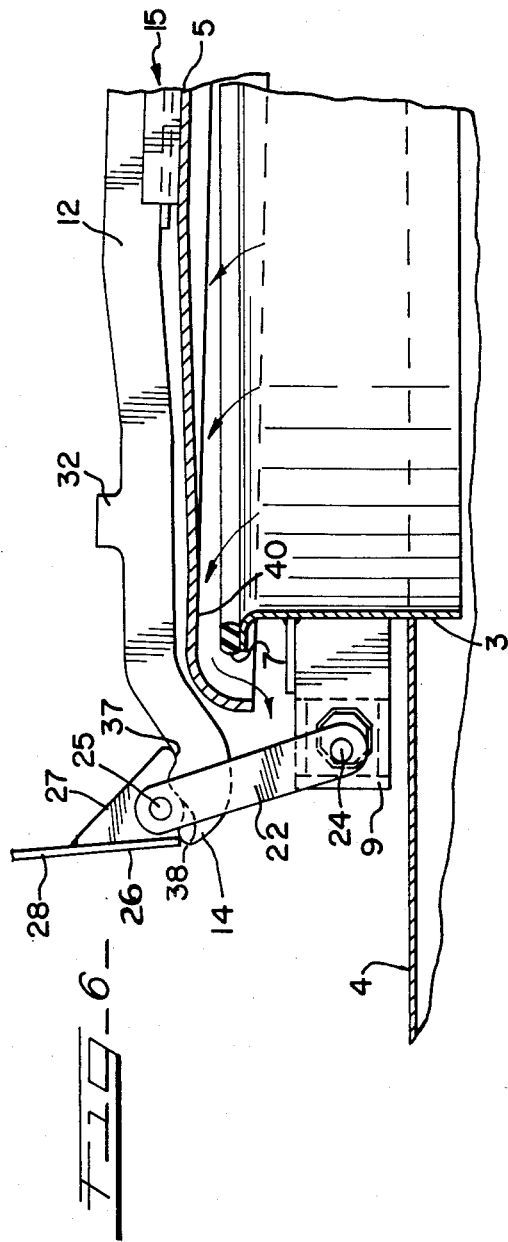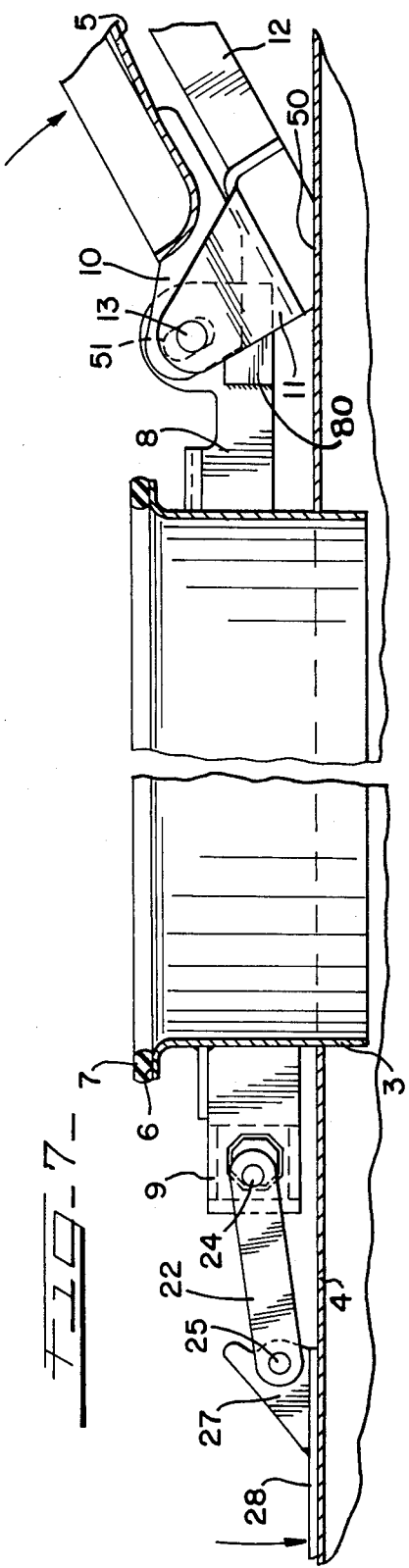

HATCH COVER AND LOCKING STRUCTURE

BACKGROUND OF THE INVENTION

1. Field of the Invention

This invention relates to hatch covers for cargo carrying vessels, such as the hopper of a railway covered hopper car.

2. Description of the Prior Art

Locking arrangements for lockingly sealing a hatch cover to a hatch opening or coaming of a vessel, such as the lading hopper of a railway covered hopper car, are old and well known.

U.S. Pat. Nos. 2,745,362; 3,307,498; 3,760,743; 4,126,094; 4,248,160 and 4,388,873 show various sealing and locking arrangements for hatch covers.

None of the above listed patents show the structure and advantages contained in the hatch cover and locking arrangement of this disclosure.

SUMMARY OF THE INVENTION

A hatch cover locking bar having two detents at the locking end coacts with an over center locking member having two lobes which coact with the detents. The rotatable, pivotally mounted locking member is positionable with respect to the locking bar to enable the cover to be in a sealingly engaged position with the hatch, or in an unsealed or pressure blow-off, position or in a disengaged position to enable the hatch cover to be pivotally removed from the hatch.

A rotative pressure adjustment of the locking member is provided to enable selective control of the sealing pressure of the hatch cover on the hatch.

BRIEF DESCRIPTION OF THE DRAWINGS

FIG. 1 is a top plan view of a hatch cover having the locking structure of this invention;

FIG. 2 is a partial sectional view of FIG. 1 as indicated by the section line 2—2;

FIG. 3 is a full section view of FIG. 1 as indicated by the section line 3—3;

FIG. 4 is an enlarged detail view showing the hatch cover lock in the locked and sealed position;

FIG. 5 is an enlarged detail view showing the hatch cover lock in a partially unlocked position;

FIG. 6 is an enlarged detail view showing the hatch cover and lock in a gas pressure dissipation or blow-off position; and FIG. 7 is a sectional view showing the hatch cover lock in the unlocked and disengaged position with the hatch cover pivotally removed from the hatch.

DETAILED DESCRIPTION OF THE PREFERRED EMBODIMENT

FIG. 1 shows a top plan view of a hatch cover assembly 2 and FIG. 3 is a sectional view of hatch cover assembly 2 as indicated by the section line 3—3 in FIG. 1. The hatch cover assembly 2 is shown mounted on and sealingly engaged with a cylindrical coaming or hatch opening 3 mounted on an appropriate vessel, such as a top portion of a hopper 4 of a railway covered hopper car.

Hatch cover assembly 2 is comprised of a circular hatch cover 5 adapted to sealingly engage the top surface 6 of coaming 3. An appropriate seal means, such as circular resilient elastomeric seal member 7, is interposed between the hatch cover 5 and the top surface 6 of coaming 3, substantially as shown in FIG. 3.

Suitable hinge means, such as a pair of hinge brackets 8, are affixed to the coaming 3 by appropriate means, such as welding. At a position on coaming 3 substantially diametrically opposed to hinge brackets 8 a lock mounting bracket 9 is affixed to the coaming.

Pivotally engaged with hinge brackets 8 is a hatch cover hinge member 10 which is rigidly affixed to a portion of hatch cover 5. Also pivotally engaged with hinge brackets 8 is a locking bar 12 having a hinge member 11 which is rigidly affixed adjacent the hinge end of the locking bar 12. Each the hatch cover hinge member 10 and the locking bar hinge member 11 are pivotally engaged with hinge brackets 8 by appropriate means, such as hinge bolt and nut assembly 13. Hatch cover hinge bracket 10 has an elongated opening or slot 51 which receives the hinge bolt of hinge bolt assembly 13.

Locking bar 12 overlays or extends over the top of the hatch cover 5 and terminates in a locking end portion 14.

Substantially at the center of the hatch cover 5 a locking bar attachment slide assembly 15 is affixed to the hatch cover. As best shown in FIG. 2, attachment slide assembly 15 is formed of a first slide member 16 and a second slide member 17 affixed to the attachment cover by appropriate means, such as welding. A pressure and slide plate 18 preferably extends between members 16 and 17 and is also rigidly affixed to the hatch cover. As shown, members 16 and 17 are positioned substantially parallel to each other and are laterally spaced from each other. Slide plate entrapment means, such as laterally inward extending wall 19 on member 16 and laterally inward extending wall 20 on member 17, are spaced above and substantially parallel to plate 18.

Rigidly affixed to a central, lower surface portion of locking bar 12 is a locking bar slide plate 21. Slide plate 21 is dimensioned to be entrapped between plate 18 and walls 19 and 20 whereby slide plate 21 maintains the locking bar 12 slidably engaged with the attachment slide 15. This arrangement maintains the locking bar 12 and hatch cover 5 engaged to each other and enables them to be substantially nonbindingly opened and closed by pivoting about hinge bolt assembly 13 regardless of the position of the hinge bolt along slot 51.

Engaged with locking bracket 9 are a pair of lock links 22 and 23. Locking links 22 and 23 are positioned in a substantially parallel spaced relationship and pivotally engaged at their lower end portions to locking bracket 9 by appropriate means, such as a hinge pin 24. Adjacent their upper portions the links 22 and 23 are pivotally engaged by a hinge pin 25 to a locking member 26. Locking member 26 has a locking cam member 27 and an operating arm or treadle 28 affixed to the cam member.

Adjacent end portion 14 of locking bar 12 a locking detent 30 and a retention detent 31 are provided.

An operating arm position limiting means, such as upwardly extending positioning protrusion 32, is affixed to locking bar 12 and limits the pivotal or rotative downward locking movement of operating arm 28 with respect to locking bar 12. Protrusion 32 could alternatively be affixed to arm 28 and extend downwardly to contact an upper surface of locking bar 12 to perform the same function.

An appropriate hatch lock and tamper indicating sealing means, such as cable 33, is placed around bar 12 and inserted through a pair of openings 34 and 35 in treadle or operating arm 28 and connected together by appropriate tamper indicating seal means, such as pressed metal seal member 36. Seal member 36 generally must be removed by partial and evident destruction. This arrangement protects the integrity of the contents of the hopper during transit.

Referring to FIGS. 4 and 5 it will be seen that locking cam member 27 of locking member 26 has a first cam lobe 37 and a second cam lobe 38. Lobe 37 is alignable to coact with detent 30 of the locking bar and lobe 38 is alignable or positionable to coact with retaining detent 31.

As shown in FIG. 4, in which the hatch is in the locked and sealed position, lobe 37 is in a downward pressure exerting over-center locked position in detent 30 when operating arm 28 is in contact with protrusion 32. In this position, the locking member 26 is not susceptible to being inadvertently unlocked or vibrated loose.

Pivot or hinge pin 24 at the lower end position of locking links 22 and 23 is, as shown, eccentrically pivotally engaged with a sealing pressure adjustment member 60 having a circumference defined by a plurality of flats, such as flat 61. Member 60 is received within an opening defined by aperture means having a plurality of flats, such as flat 62, within locking bracket 9. Disassembly of locking links 22 and 23 from pivot pin 24 enables member 60 to be withdrawn from the opening defined by flats 62 and rotated about the axial direction of member 60 to a different angular orientation and reinserted to enable selective adjustment of the pressure imposed on the locking bar 12 by the cam member 27 and, consequently, the amount of pressure transferred to the hatch cover 5 and seal member 7 by the locking bar placing pressure on the hatch cover at slide assembly 15.

Due to the eccentric mounting of pin 24 in member 60, repositioning member 60 one flat clockwise relative to the position shown in bracket 9 would decrease the locking pressure and repositioning member 60 one flat counter-clockwise relative to the position shown would increase the locking pressure. The member 60 coacting with the opening in bracket 9 makes a dependable locking and sealing pressure adjustment which is much less susceptible to being made inoperable by corrosion.

FIG. 5 shows locking cam member 27 and operating arm 28 in an intermediate position in which lobe 37 is aligned for engagement with detent 30 and lobe 38 is aligned for engagement with detent 31. The cover is closed by gravity and no upward pressure within the tank is trying to blow the cover open or unseal it.

However, as shown in FIG. 6, a frequent occurence is that the lading in the hopper is of a nature to impose an upward or unsealing gas pressure on the underside 40 of the hatch cover 5, as indicated by the flow arrows. These forces can be of sufficient magnitude to cause a hatch cover to be forced to swing completely open upon unlatching of the locking mechanism. Consequently, it is desirable to restrict such movement.

As shown in FIG. 6, the hatch of this invention precludes the blowing open of the hatch cover as the lobes 37 and 38 would engage the detents 30 and 31 at end portion 14 of locking bar 12 as the hatch cover and bar are forced pivotally upwardly about hinge pin 13.

The latch and hatch will remain in the position shown until the gas pressure within the hopper has been dissipated through the unsealed, but secured, hatch cover.

After the pressure has bled off the hatch cover will settle by gravity down onto the seal member 7 to be in substantially the position shown in FIG. 5.

The latch operator can then manually pivot locking member 26 outwardly on links 22 and 23 to remove locking arm member 27 from potential interfering engagement with end 14 of locking bar 12, as shown in FIG. 7. The locking member 26 and links 22 and 23 would then be in substantially the position shown in FIG. 7. The hatch cover 5 and locking bar 12 can then be pivoted about hinge bolt assembly 13 to the open position shown in FIG. 7. The hatch defined by coaming 3 is then open to allow the addition to or removal of lading contained in the tank.

As best shown in FIGS. 3 and 7, a flat or relief area 50 is provided adjacent the top portion of locking bar 12 above hinge member 11. Relief 50 precludes interference of the locking bar with the hopper roof and enables the cover to be substantially completely opened.

Cover open position limiting means, such as a stop block 80, as best shown in FIGS. 3 and 7, are rigidly affixed, such as by welding, to each hinge bracket 8. These stop blocks interferingly engage member 11 of locking bar 12 as the cover is opened to limit rotation of the cover assembly short hinge bolt 13.

Slot 51 in hinge member 10 affixed to cover 5 is provided to enable the cover, which is somewhat flexible compared to locking bar 12, to be moved downwardly with respect to pivot bolt assembly 13 when the cover is sealed. As the hinge bolt of assembly 13 may be anywhere along the slot 51 at the time the hatch and locking bar are pivoted about the hinge bolt, the locking bar is engaged with the hatch cover by slide assembly 15 to preclude binding.

What is claimed is:

1. A hatch cover assembly for covering a hatch of a lading container, said hatch cover assembly comprising:
    a locking bar and a hatch cover, said locking bar having a first end portion pivotally mounted to a first portion of said hatch for enabling said hatch cover to be moved to an open position or a closed position with respect to said hatch, said locking bar being adapted for overlaying said hatch cover in the closed position, said locking bar having a second end portion having a locking detent and a retaining detent;
    a locking member pivotally engaged with a mounting member affixed to a second portion of said hatch, said locking member being pivotally and rotatably selectively engagable with said locking detent and retaining detent of said second end portion of said locking bar, said locking member having first and second lobes thereon, said first lobe engaging the locking detent to cammingly coact therewith for sealingly engaging said hatch cover to said hatch and said first lobe and second lobe engaging said locking detent and said retaining detent respectively in a pressure release position for retainingly engaging said locking bar for allowing pressure within said container to be dissipated before said locking menber is pivotally movable to a position out of engagement with said second end of said locking bar.

2. The invention as defined in claim 1 in which said locking member is pivotally engaged with said mounting member by a pair of links, said links having a lower portion pivotally engaged with said mounting member by a first hinge pin and said links having an upper portion pivotally engaged with said locking member by a second hinge pin.

3. The invention as defined in claim 2 in which said locking member is comprised of a cam member carrying said first and second lobes and pivotally engaged with said upper portion of said links and the locking member includes an operator arm affixed to said cam member for facilitating manual rotation of said locking member about said second hinge pin.

4. The invention as defined in claim 3 in which said first lobe of said locking member has a camming portion engagable with said locking detent of said second end portion of said locking bar for camming said locking bar downwardly for sealingly engaging said hatch cover to said hatch.

5. The invention as defined in claim 4 together with a spacer member affixed to said locking bar and positioned for having a portion of said operator arm contact an end of said spacer member when said cam member has been rotated into a locked position.

6. The invention defined in claim 4 together with adjusting means for adjusting the distance said second end is cammed downwardly by said camming portion.

7. A hatch cover assembly for covering a hatch of a lading container, said hatch cover assembly comprising:
a hatch cover and a locking bar;
hinge means affixed to a first portion of said hatch and to a first portion of said hatch cover and said locking bar for pivotally engaging said locking bar and said hatch cover to said hatch, said locking bar being adapted to contactingly overlay said hatch cover in a closed position and said locking bar having a second portion distal said first portion, said second portion having a lock engaging portion having a locking detent and a retaining detent;
a locking member pivotally engaged with a mounting member affixed to a second portion of said hatch, said locking member being pivotally and rotatably selectively engageable with said locking detent and retaining detent of said locking bar, said locking member having a first lobe lockingly engageable with said locking detent for sealingly engaging said hatch cover to said hatch and said locking member further having a second lobe, said first lobe and said second lobe engaging said locking detent and said retaining detent respectively in a pressure blow-off position for retainingly engaging said locking bar for enabling pressure within said vessel to be dissipated through said hatch and for distributing the force of the initial movement of the hatch cover through the locking member and the lock engaging portion of the locking bar.

8. The invention as defined in claim 7 in which said hatch cover is pivotally mounted to said hinge means by a slot receiving a hinge bolt for enabling said hatch cover to move downwardly with respect to said hinge bolt when said locking bar overlaying said hatch cover imposes downward pressure on said hatch cover.

9. The invention as defined in claim 8 together with a slide assembly affixed to a center portion of said hatch cover and said slide assembly entrappingly receiving a slide plate affixed to said locking bar whereby said locking bar and said hatch cover remain slidably engaged to each other as they are pivoted about said hinge means.

10. The invention as defined in claim 7 said, first lobe coacting with said locking detent to form an over center lock as said locking member is rotated into locking engagement with said locking bar.

11. The invention as defined in claim 7 and said second lobe is aligned for contacting said retaining detent when said locking member is rotated from a locked position to an unlocked position.

12. In a hatch cover locking assembly, said locking assembly having a linkage having a first portion pivotally engaged with a mounting bracket on a hatch and a second portion pivotally engaged with a camming member for forcing said hatch cover downwardly into sealing engagement with said hatch, an improved camming pressure adjustment comprising:
aperture means in said mounting bracket,
an adjustment member supported in said aperture means and the adjustment member and the aperture means being shaped to constrain the adjustment member in the aperture means against rotation in one of a plurality of angular positions oriented about the axial direction of the adjustment member;
pivot means eccentrically mounted on said adjustment member, said first portion of said linkage being mounted to said pivot means whereby the camming pressure of the locking assembly on the hatch cover is adjusted by selective placement of the adjustment member in one of the angular positions.

13. The invention as defined in claim 12 in which each said adjustment member and said opening are octagonal.

14. The invention as defined in claim 12 in which said pivot means is a hinge pin eccentrically mounted in said adjustment member and said linkage is pivotally mounted on said hinge pin.

15. The invention according to claim 12, and
the adjustment member being insertable into and removable from the aperture means for adjusting the angular position of the adjustment member with respect to the aperture means.

16. The invention according to claim 15, and
the aperture means in cross section being in the shape of a polygon.

17. The invention according to claim 16, and
said adjustment member being polygonal in cross section for being conformingly received in said aperture means and being secured against rotation therein.

18. The invention according to claim 12, and
the adjustment member being polygonal in cross section for being secured against rotation in said aperture means.

19. The invention according to claim 1, and
said first and second lobes extending into respective detents and engaging the locking bar therein in the pressure release position.

* * * * *